(12) United States Patent
Iyer (10) Patent No.: US 9,870,848 B2
(45) Date of Patent: Jan. 16, 2018

(54) MULTIPLE STRESS CONTROL DEVICE FOR CABLE ACCESSORIES AND METHODS AND SYSTEMS INCLUDING SAME

(71) Applicant: Tyco Electronics Corporation, Berwyn, PA (US)

(72) Inventor: Ganpathy Iyer, Cary, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 20 days.

(21) Appl. No.: 15/135,781

(22) Filed: Apr. 22, 2016

(65) Prior Publication Data

US 2017/0309376 A1    Oct. 26, 2017

(51) Int. Cl.
| | |
|---|---|
| H02G 15/08 | (2006.01) |
| H01B 17/44 | (2006.01) |
| H01B 19/00 | (2006.01) |
| H01B 13/06 | (2006.01) |
| H02G 15/064 | (2006.01) |

(52) U.S. Cl.
CPC ........... *H01B 17/44* (2013.01); *H01B 13/062* (2013.01); *H01B 19/00* (2013.01); *H02G 15/064* (2013.01)

(58) Field of Classification Search
None
See application file for complete search history.

(56) References Cited

U.S. PATENT DOCUMENTS 3,585,274 A   6/1971 Tomaszewski et al.
3,796,821 A * 3/1974 Lusk ................... H02G 15/068
                                                174/73.1
(Continued)

FOREIGN PATENT DOCUMENTS

CA    2 031 262 C    6/1991
EP    0 780 949 A1   6/1997
(Continued)

OTHER PUBLICATIONS

Strobl, R., W. Haverkamp, G. Malin, and F. Fitzgerald. "Evolution of Stress Control Systems in Medium Voltage Cable Accessories." *2001 IEEE/PES Transmission and Distribution Conference and Exposition. Developing New Perspectives* (Cat. No. 01CH37294) (n.d.): n. pag. Print.

(Continued)

*Primary Examiner* — Dimary Lopez Cruz
(74) *Attorney, Agent, or Firm* — Myers Bigel, P.A.

(57) ABSTRACT

Provided are devices, methods and systems. A cover system may include a unitary cold shrinkable, tubular, elastomeric cover sleeve defining a cover sleeve through passage that is configured to receive the electrical cable. The cover sleeve may include a first type of stress control element and a second type of stress control element that is different from the first type of stress control element. A holdout maintains the cover sleeve in an expanded state in which the cover sleeve is elastically expanded and when removed, permits the cover sleeve to radially contract to a contracted state about the electrical cable. The first type of stress control element includes a geometric stress cone that includes an electrically conductive and/or semiconductive portion that is configured to conductively engage a semiconductor layer of the electrical cable. The second type of stress control element includes a high-K stress relief element.

24 Claims, 3 Drawing Sheets

(56) References Cited

U.S. PATENT DOCUMENTS

| | | | | |
|---|---|---|---|---|
| 4,822,952 | A * | 4/1989 | Katz | H02G 15/064 |
| | | | | 156/49 |
| 4,831,214 | A | 5/1989 | Wilck | |
| 4,963,819 | A * | 10/1990 | Clarke | G01R 15/16 |
| | | | | 174/73.1 |
| 5,316,492 | A | 5/1994 | Schaareman | |
| 5,801,332 | A * | 9/1998 | Berger | H02G 15/103 |
| | | | | 174/73.1 |
| 6,025,560 | A * | 2/2000 | De Buyst | H02G 15/103 |
| | | | | 174/88 C |
| 7,251,881 | B2 | 8/2007 | Nguyen et al. | |
| 7,476,114 | B1 | 1/2009 | Contreras | |
| 7,901,243 | B1 * | 3/2011 | Yaworski | H01R 4/34 |
| | | | | 439/523 |
| 9,429,594 | B2 * | 8/2016 | Bolcato | |
| 2004/0209025 | A1 | 10/2004 | Kobayashi et al. | |
| 2013/0248224 | A1 | 9/2013 | Gravermann et al. | |
| 2014/0076627 | A1 | 3/2014 | Maher | |
| 2014/0151084 | A1 * | 6/2014 | Spalding | H01B 3/30 |
| | | | | 174/120 SR |
| 2014/0338953 | A1 * | 11/2014 | Seraj | H01R 4/70 |
| | | | | 174/138 F |
| 2015/0334887 | A1 * | 11/2015 | Dinu | H02G 15/1833 |
| | | | | 174/102 SC |

FOREIGN PATENT DOCUMENTS

| | | |
|---|---|---|
| WO | WO 97/32381 | 9/1997 |
| WO | WO 99/21259 | 4/1999 |
| WO | WO 00/01048 | 1/2000 |
| WO | WO 2013/096354 A1 | 6/2013 |
| WO | WO 2014/095563 A1 | 6/2014 |
| WO | WO 2015/175623 | 11/2015 |

OTHER PUBLICATIONS

Notification Concerning Transmittal of International Preliminary Report on Patentability for PCT/US2014/022608, dated Sep. 24, 2015; 9 Pages.

Notification of Transmittal of the International Search Report and the Written Opinion of the International Searching Authority, or the Declaration, in corresponding PCT Application No. PCT/US2017/025872 dated Jun. 26, 2017 (13 pages).

* cited by examiner

MULTIPLE STRESS CONTROL DEVICE FOR CABLE ACCESSORIES AND METHODS AND SYSTEMS INCLUDING SAME

FIELD OF THE INVENTION

The present invention relates to electrical cables and connections and, more particularly, to protective covers for electrical cables and connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When a power cable is terminated, the termination may create an abrupt discontinuity in the electrical characteristics of the cable. The discontinuity may change the shape of the resulting electrical field electrical stress, which may increase the risk of the insulation breaking down.

Electrical stress concentrations in cable terminations can cause degradation of cable insulation. To address this problem, terminations are commonly provided with stress control elements (e.g., a stress cone or high-K layer). Two general classes of stress relief elements include high-K or capacitive type stress relief elements and geometric type stress relief elements. A high-K type stress relief element may be generally cylindrical and may rely primarily on material selection to manage the electrical field in the electrical stresses.

At medium voltages, such as 69 kV, a high-K type stress relief element may be implemented as two separate tubes that are layered. One tube may include a high-K material and may be installed to cover the entire portion of the termination and another tube that covers only a portion of the termination.

A geometric type stress relief element may rely on the geometry of its design and material type to manage the electrical field and electrical stresses. For example, geometric type stress relief elements may include a deflector portion that pushes electric stress in the outward direction. At lower voltages, such as 5 kV, the deflector may be relatively small and may be provided in cold shrink termination devices. However, in medium voltage cable terminations, such as 69 kV, the size of the deflector portion in a geometric type stress relief element may become too great for reasonable implantation in a cold shrink termination. As such, improved stress relief solutions are needed for power cables.

SUMMARY

Some embodiments of the present invention are directed to a cover unit device for termination of an electrical cable. The device may include a unitary cold shrinkable, tubular, elastomeric cover sleeve defining a cover sleeve through passage that is configured to receive the electrical cable. In some embodiments, the cover sleeve includes a first type of stress control element and a second type of stress control element that is different from the first type of stress control element.

In some embodiments, the first type of stress control element includes a geometrical stress relief element. Some embodiments provide that the geometrical stress relief element includes a stress cone that includes an electrically conductive and/or semiconductive portion that is configured to conductively engage a semiconductor layer of the electrical cable. In some embodiments, the second type of stress control element includes a high K stress relief element.

Some embodiments provide that the cover sleeve includes a multilayer tube that includes an outer insulating layer and an inner high-K layer and a geometric stress cone that is formed within the inner high-K layer and that is configured to conductively engage a semiconductor layer of the electric cable when installed thereon. In some embodiments, the insulating layer includes an elastomeric material that includes at least one of ethylene propylene diene monomer (EPDM) rubber, silicone, polyurethane rubber, styrene-butadiene copolymer, polychloroprene, nitrile rubber, butyl rubber and/or polysulfide rubber. Some embodiments provide that the high-K layer includes carbon particles embedded therein.

In some embodiments, the cover sleeve includes a multilayer tube that includes an outer insulating layer and an inner high-K layer and a geometric stress cone that is formed within the outer insulating layer and that is configured to conductively engage a semiconductor layer of the electric cable when installed thereon.

Some embodiments provide that the device is operable to manage the electrical field and electrical stresses at operating voltages greater than 40 kVolts.

Some embodiments include a holdout that maintains the cover sleeve in an expanded state in which the cover sleeve is elastically expanded and when removed, permits the cover sleeve to radially contract to a contracted state about the electrical cable. Some embodiments provide that the holdout is a removable holdout that is mounted within the cover sleeve through passage and configured to be removed therefrom.

Some embodiments of the present invention are directed to methods for installing a cover sleeve on an electrical cable. Such methods may include providing a unitary cold shrinkable, tubular, elastomeric cover sleeve defining a cover sleeve through passage that is configured to receive the electrical cable. The cover may include a first type of stress control element, a second type of stress control element that is different from the first type of stress control element, and a holdout that maintains the cover sleeve in an expanded state in which the cover sleeve is elastically expanded and when removed, permits that cover sleeve to radially contract to a contracted state about the electrical cable. Methods may further include positioning the device to the electrical cable and removing the holdout from the cover sleeve to cause the cover sleeve to radially contract on the electrical cable.

In some embodiments, the cover sleeve includes a multilayer tube that includes an insulating layer and a high-K layer and a geometric stress cone that is formed within the high-K layer and that is configured to conductively engage a semiconductor layer of the electric cable when installed thereon.

Some embodiments provide that the cover sleeve includes a multilayer tube that includes an outer insulating layer and an inner high-K layer, a geometric stress cone that is formed within the outer insulating layer and that is configured to conductively engage a semiconductor layer of the electric cable when installed thereon.

In some embodiments, the device is operable to manage the electrical field and electrical stresses at operating voltages greater than 40 kVolts.

Some embodiments of the present invention are directed to a cover system for termination of an electrical cable. The system may include a unitary cold shrinkable, tubular, elastomeric cover sleeve defining a cover sleeve through passage that is configured to receive the electrical cable. The cover sleeve may include a first type of stress control element and a second type of stress control element that is different from the first type of stress control element. The system may further include a holdout that maintains the cover sleeve in an expanded state in which the cover sleeve is elastically expanded and when removed, permits the cover sleeve to radially contract to a contracted state about the electrical cable. In some embodiments, the first type of stress control element includes a geometric stress cone that includes an electrically conductive and/or semiconductive portion that is configured to conductively engage a semiconductor layer of the electrical cable and the second type of stress control element includes a high dielectric constant stress relief element.

In some embodiments, the cover sleeve includes a multilayer tube that includes an outer insulating layer and an inner high-K layer and the geometric stress cone that is formed within the inner high-K layer and that is configured to conductively engage the semiconductor layer of the electric cable when installed thereon. Some embodiments provide that the high-K layer comprises carbon particles embedded therein.

Some embodiments provide that an operating voltage of the electrical cable is greater than about 40 kVolts.

Further features, advantages and details of the present invention will be appreciated by those of ordinary skill in the art from a reading of the figures and the detailed description of the embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Reference numerals are indicated in detail in some embodiments of the present invention, and their examples are represented in reference drawings. Throughout the drawings, like reference numerals are used for referring to the same or similar elements in the description and drawings.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

As used herein, "monolithic" means an object that is a single, unitary piece formed or composed of a material without joints or seams.

As used herein, "high-K material" means high electrical permittivity material.

Figure 1:
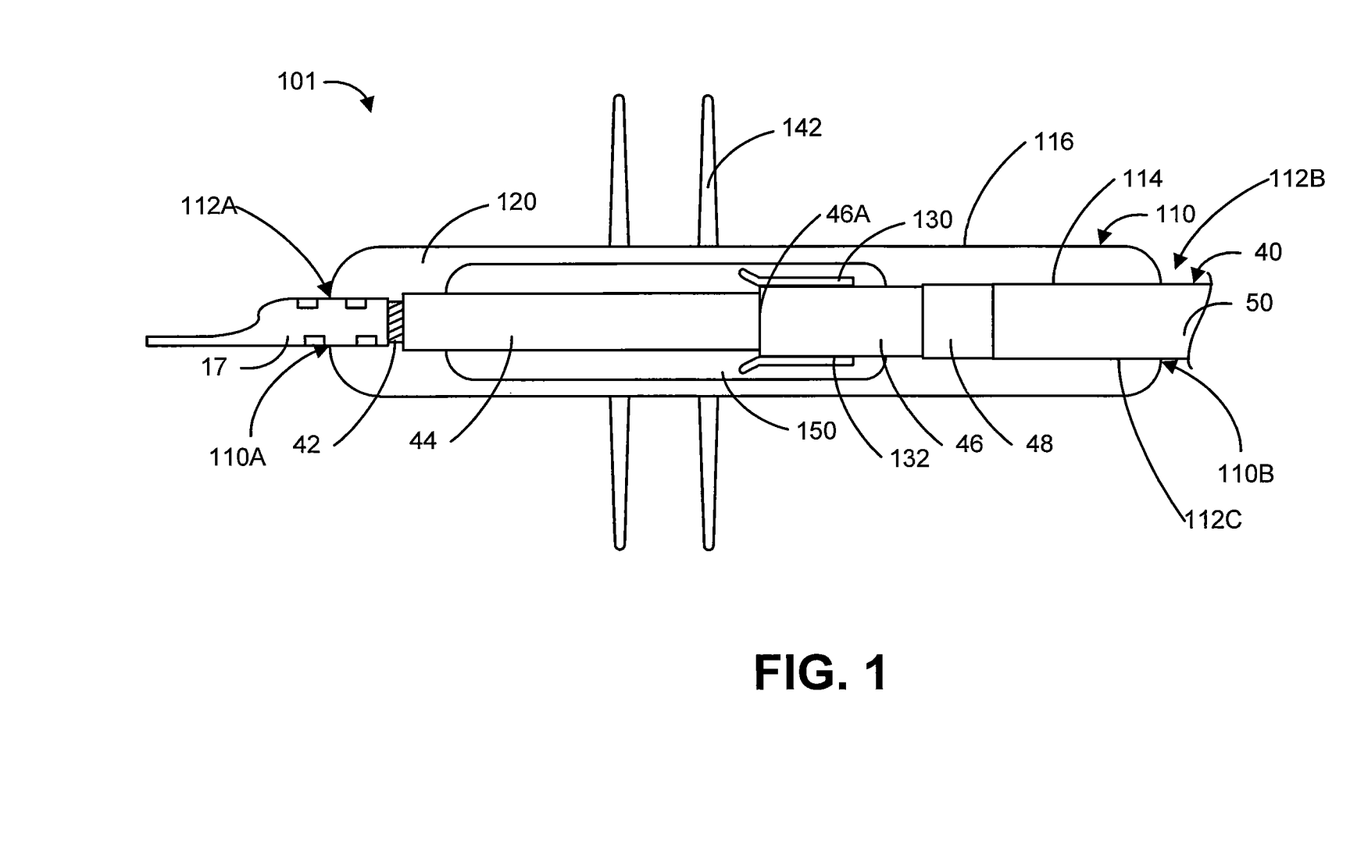
FIG. 1 is a side cross-sectional schematic view of a cover unit including multiple types of stress control elements secured to a cable according to some embodiments of the invention.

Reference is now made to FIG. 1, which is a side cross-sectional schematic view of a cover unit including multiple types of stress control elements secured to a cable (not shown in cross-section) according to some embodiments of the invention. A cover system 101 according to some embodiments of the present invention includes a termination body or cover assembly, unit, body or sleeve 110 that includes multiple stress control elements and/or types thereof. The cover system 101 may be used to form a protected cable assembly including a terminated (or spliced) cable 40, a termination or connector 17, and the cover sleeve 110. In some embodiments, the cover system 101 or a portion thereof is provided as a unitary cold shrinkable, tubular, elastomeric cover sleeve defining a cover sleeve through passage that is configured to receive the electrical cable 40. The cover sleeve 110 may be a multilayer device that includes a first type of stress control element and a second type of stress control element that is different from the first type of stress control element.

Some embodiments provide that the cable 40 includes a primary electrical conductor 42, a polymeric insulation layer 44, a semiconductor layer 46, a metal electromagnetic radiation shield layer 48, and a jacket 50, with each component being concentrically surrounded by the next.

According to some embodiments and as shown, the shield layer 48 includes a metal tape, foil, strip or sheath wrapped or wound (e.g., circumferentially or helically) about and fully circumferentially surrounding the semiconductor layer 46 along the length of the cable 40. In some embodiments, the shield layer 48 may include individual concentric neutral wires longitudinally and/or helically wound about the semiconductor layer 46 along the length of the cable 40 and about a center axis of the cable that corresponds to the longitudinal center of the primary electrical conductor 42, for example.

The primary electrical conductor 42 may be formed of any suitable electrically conductive materials such as copper (solid or stranded).

The polymeric insulation layer 44 may be formed of any suitable electrically insulative material such as crosslinked polyethylene (XLPE) or EPR.

The semiconductor layer 46 may be formed of any suitable semiconductor material such as carbon black with silicone. In some embodiments, the semiconductor layer has a thickness in the range of from about 0.030 to 0.070 inch, however, such embodiments are non-limiting.

The shield layer 48 may be formed of any suitable material such as copper.

The jacket 50 may be formed of any suitable material such as EPDM rubber or PVC.

According to some embodiments, the cable 40 is a medium-voltage or high-voltage (e.g., greater than about 40 kV) power transmission cable. According to some embodiments, the cable 40 has a size (outer diameter) in the range of from about 0.6 to 5 inches.

According to some embodiments, the cover sleeve 110 is a cold shrink cover, meaning that it can be shrunk or retracted about the substrate(s) without requiring the use of applied heat.

The cover sleeve 110 includes an outer, electrically insulating sleeve or layer 120. The longitudinal center of the primary electrical conductor 42 may form a longitudinal axis which may be common to a longitudinal axis of the cover sleeve 110 when installed on the electrical cable 40.

The cover sleeve 110 has opposed inner and outer surfaces 114 and 116, and opposed ends 110A, 110B. The cover sleeve 110 is tubular and defines an axially extending conductor through passage 112C that communicates with opposed end openings 112A, 112B. In some embodiments, the cover sleeve 110 may include integral sheds 142.

In some embodiments, the electrically insulating layer 120 may form the outer surface 116 and have the opposed inner surface 114. The electrically insulating layer 120 is tubular and may define an axially extending conductor through passage that communicates with the opposed end openings 112A, 112B.

The electrically insulating layer 120 can be formed of any suitable elastically expandable, dielectric or electrically insulating material. According to some embodiments, the electrically insulating layer 120 has a Modulus at 100 percent elongation (M100) in the range of from about 0.13 to 0.80 MPa. According to some embodiments, the electrically insulating layer 120 is formed of an elastomeric material. According to some embodiments, the electrically insulating layer 120 is formed of ethylene propylene diene monomer (EPDM) rubber, liquid silicone rubber (LSR), ethylene propylene rubber (EPR), neoprene, silicone rubber, or other suitable rubber.

Additionally, the cover sleeve 110 may be multilayered and may include multiple types of stress control elements that may smooth the abrupt change in the electrical field that can cause electrical stress at the terminal edge 46A of the cable semiconductor layer 46. Such electrical stress, if not addressed by a stress control element, may cause the insulation of the cable 40 to breakdown.

A first type of stress control element may include a geometric stress relief element such as, for example, a stress cone 130. In some embodiments, a stress cone may include an integral electrically conductive (e.g., semiconductive) stress element layer or cone 130. In some embodiments, the layers 120 and 130 are thus formed of electrically and functionally dissimilar materials.

The stress cone 130 may be a layer that is a generally tubular sleeve that extends axially such that the inner surface 132 of the stress cone 130 defines an axially extending conductor through passage that defines, in part, the passage 112C.

The stress cone 130 may be formed of a suitable electrically conductive, elastically expandable material. According to some embodiments, the stress cone 130 is formed of a material having a Modulus at 100 percent elongation (M100) in the range of from about 0.15 to 0.90 MPa. According to some embodiments, the stress cone 130 is formed of an elastomeric material. According to some embodiments, the stress cone 130 is formed of liquid silicone rubber (LSR), EPDM rubber, or ethylene propylene rubber (EPR). The elastomeric material may include an electrically conductive filler material such as carbon black, for example.

A second type of stress control element may include a capacitive stress relief element such as, for example, a high-K tube 150. In some embodiments, the high-K tube 150 may also be referred to as a high-K layer 150. The high-K tube 150 may include a high-K material such as EPDM rubber. Some embodiments provide that the high-K tube has a dielectric constant that is greater than about 12. The length of the high K tube 150 may be determined by the dielectric constant of the tube. As illustrated, some embodiments provide that the high-K tube 150 may be bonded to an inner surface of the electrically insulating layer 120 and/or embedded in and/or integral to the electrically insulating layer 120. Additionally, the stress cone 130 may be bonded to an inner surface of the high-K tube 150 and/or embedded in and/or integral to the high-K tube 150. In this manner, the stress cone 130 and the high-K tube 150 may be integrally formed in the cover sleeve 110 to provide a unitary structure that includes multiple layers that include multiple types of stress control elements. The stress control elements (e.g., stress cone and high-K tube) may have a different shapes than illustrated in FIG. 1.

When the cover sleeve 110 is properly installed on the cable 40, the stress control element 130 and the high-K tube 150 in combination serve to taper the electrical field lines by forcing them to follow the contour of the stress cone 130 and to reduce the concentration of the field lines at the terminal edge 46A.

The cover sleeve 110 may be formed by any suitable method and apparatus. According to some embodiments, the stress cone 130 is molded and the high-K layer 150 is molded around the stress cone 130. The electrically insulating layer 120 may then be molded around the high-K layer 150 and stress cone 130. In this manner, a multiple-layer unitary cold shrinkable, elastomeric cover sleeve that includes two types of stress relief elements may be formed. As described and illustrated, the first type of stress relief element is radially disposed between the cable 40 and the second type of stress relief element.

Although not illustrated or described herein, other components may also be included and/or implemented when practicing embodiments herein including sealants, tapes, clamps, straps, retention members, and/or positioning devices as needed.

Figure 2:
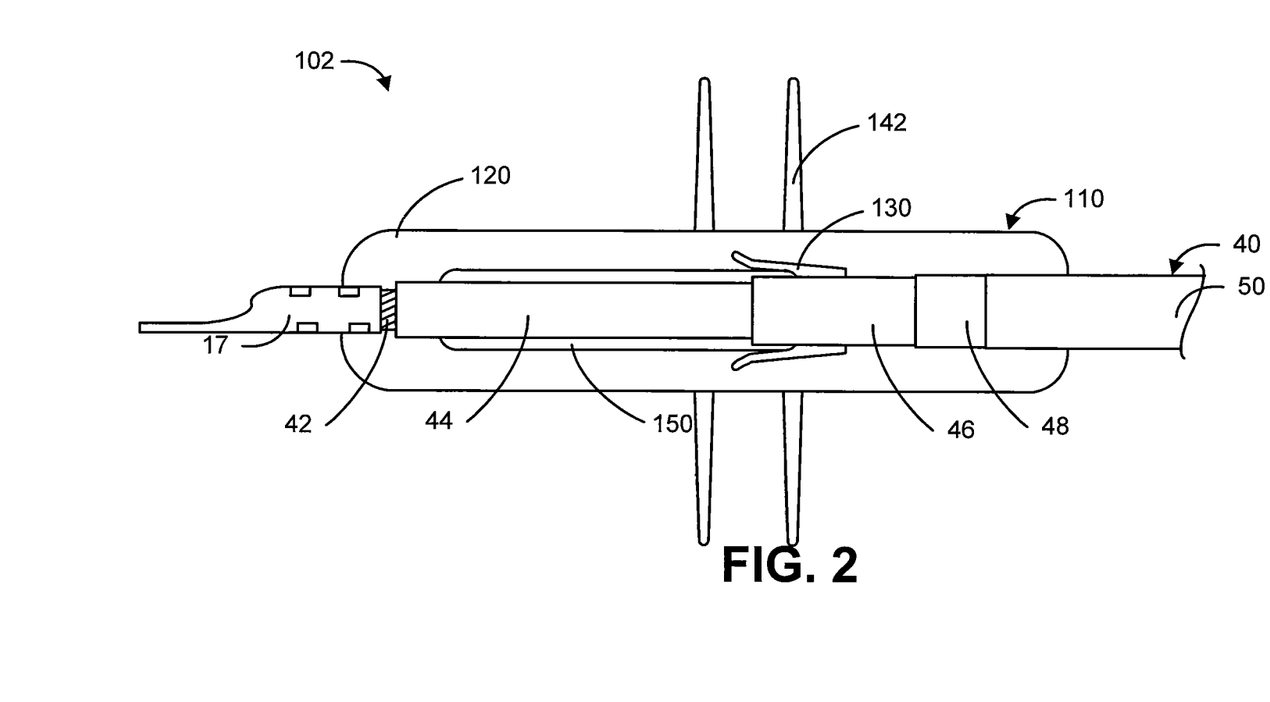
FIG. 2 is a side cross-sectional schematic view of a cover unit including multiple types of stress control elements secured to a cable according to some other embodiments of the invention.

Reference is now made to FIG. 2, which is a side cross-sectional schematic view of a cover unit including multiple types of stress control elements secured to a cable according to some other embodiments of the invention. In FIG. 2, reference numerals that are the same as those of FIG. 1 denote the same elements, and thus, their detailed description may be omitted.

A cover system 102 according to some embodiments of the present invention includes a cover sleeve 110 that includes multiple stress control elements and/or types thereof. Similar to the cover system 101 illustrated in FIG. 1, the cover sleeve 110 is a multilayer cover that includes the stress cone 130, the high-K tube 150 and the electrically insulating layer 120. In contrast with the cover system 101 illustrated in FIG. 1, the cover sleeve 110 of FIG. 2 provides that the stress cone 130 may be bonded to an inner surface of the electrically insulating layer 120 and/or embedded in and/or integral to the electrically insulating layer 120. Additionally, the electrically insulating layer 120 may be bonded to an outer surface of the high-K tube 150 and/or embedded in and/or integral to the high-K tube 150. In this manner the stress cone 130 and the high-K tube 150 may be integrally formed in the cover sleeve 110 to provide a unitary structure that includes multiple layers that include multiple types of stress control elements.

In some embodiments, the high-K tube 150 may be formed to be on a portion of an inner surface of the stress cone 130. Some embodiments provide that the high-K tube 150 may include an inner surface having a portion that contacts a portion of the semiconductor layer 46. In such embodiments, the stress cone 130 may include an inner surface having a portion that contacts another portion of the semiconductor layer 46.

The cover system 102 may be used to form a protected cable assembly including a terminated (or spliced) cable 40, a termination or connector 17, and the cover sleeve 110. In some embodiments, the cover system 102 or a portion thereof is provided as a unitary cold shrinkable, tubular, elastomeric cover sleeve defining a cover sleeve through passage that is configured to receive the electrical cable 40. The cover sleeve 110 may be a multilayer device that includes a first type of stress control element and a second type of stress control element that is different from the first type of stress control element.

Figure 3:
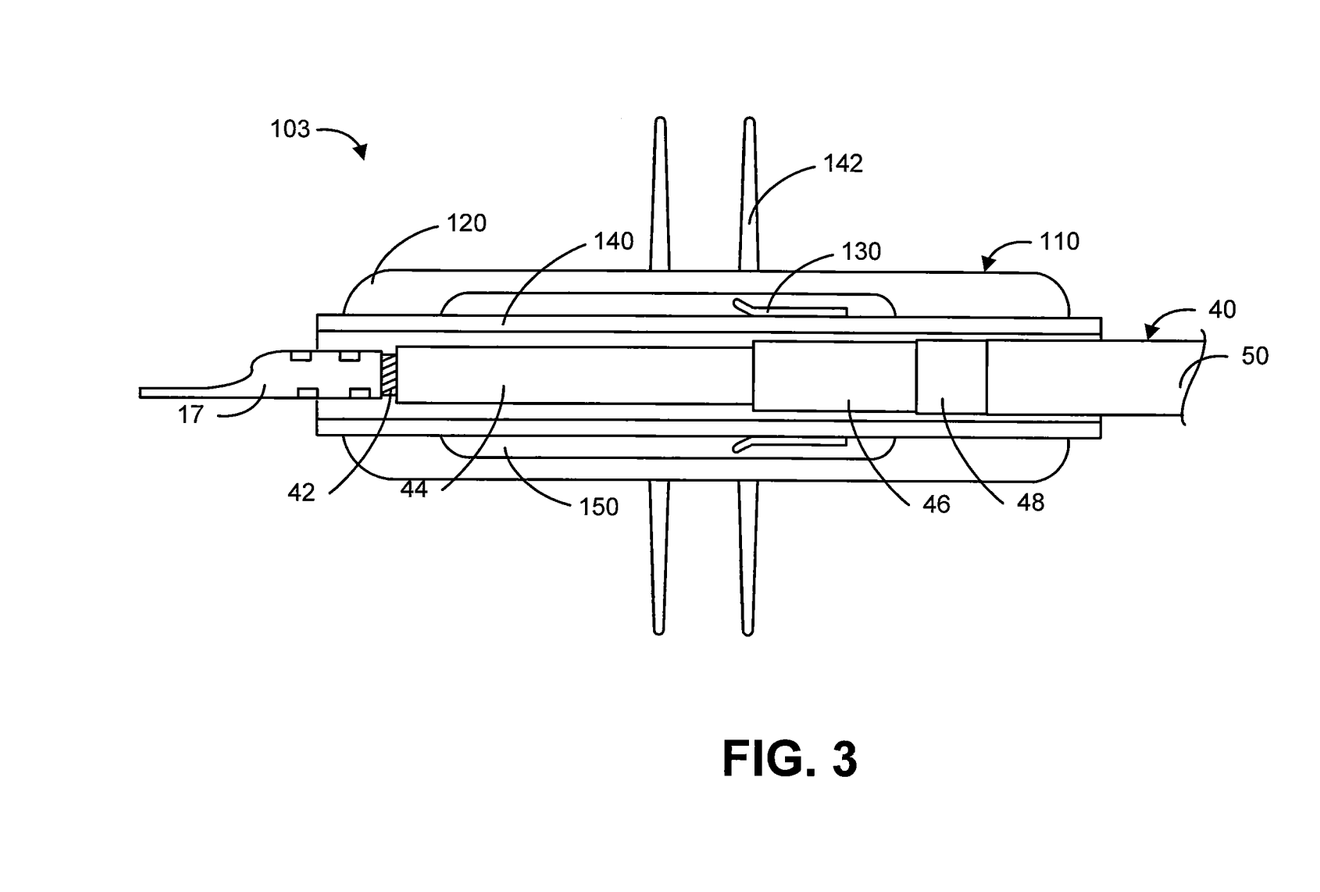
FIG. 3 is a side cross-sectional schematic view of a pre-expanded cover unit including multiple types of stress control elements and a holdout positioned on a cable according to some embodiments of the invention.

Reference is now made to FIG. 3, which is a side cross-sectional schematic view of a pre-expanded cover unit including multiple types of stress control elements and a holdout positioned on a cable according to some embodiments of the invention. In FIG. 3, reference numerals that are the same as those of FIGS. 1 and 2 denote the same elements, and thus, their detailed description may be omitted. In some embodiments and as illustrated in FIG. 3, the cover sleeve 110 may be provided as a pre-expanded cover unit. In such embodiments, in addition to elements described above regarding FIGS. 1 and 2, the cover system 103 may further include a holdout 140 that is configured to retain the cover sleeve 110 in an expanded position.

In some embodiments, the cover sleeve 110 is mounted on the holdout 140 in an expanded state or position. Some embodiments provide that the holdout 140 is a disintegratable or collapsible rigid tube. According to some embodiments, the holdout 140 is what is commonly referred to as a spiral holdout or core. Some embodiments provide that the holdout 140 is a non-spiral core that may be removable and/or retractable.

The holdout 140 may include a tubular, cylindrical member or body. The holdout 140 may include through passage or bore 142C communicating with opposed end openings thereof. In some embodiments, the holdout 140 includes a continuous, flexible ribbon or strip that is helically wound to form a series of looped strip segments. The segments may be releasably or detachably joined to the respective adjacent segments along their edges to thereby form or constitute the holdout body in the form of a rigid, tubular cylinder. Examples of suitable holdouts may include holdouts as disclosed in U.S. Pat. No. 5,925,427 to Sadlo et al., U.S. Pat. No. 5,944,929 to Vallauri et al. and U.S. Pat. No. 5,670,223 to Sadlo et al, which are incorporated by reference.

The holdout 140 can be formed of any suitable material. According to some embodiments, the holdout 140 is formed of a semi-rigid polymeric material. According to some embodiments, the holdout 140 is formed of high density polyethylene (HDPE), low density polyethylene (LDPE), polypropylene, ABS, or PVC.

When mounted on the holdout 140, the cover sleeve 110 is maintained in an elastically radially expanded state or position. According to some embodiments, in the expanded state the cover sleeve 110 is expanded in the range of from about 200 to 400 percent of its relaxed diameter (i.e., not on a substrate). As a result, the cover sleeve 110 of the pre-expanded unit 102 will exert a radially compressive pressure or load on the holdout 140.

When the holdout 140 is withdrawn (unravelled), the cover sleeve 110 shrinks towards the cable 40. The relaxed inner diameter of the cover sleeve 110 is less than at least the outer diameter of the jacket 50 and the outer diameter of the semiconductor layer 46. Therefore, the cover sleeve 110 exerts a persistent radially inwardly compressive or clamping force or pressure (due to elastic tension) onto the cable 40. The cover sleeve 110 may thereby effect a liquid tight seal at the interface between the cable 40 and the cover sleeve 110. This seal can protect the cable and the connection from the ingress of environmental moisture. According to some embodiments, the relaxed inner diameter of the cover sleeve 110 is between about 20 and 40 percent less than the smallest diameter cable upon which the cover sleeve 110 is intended to be installed.

While illustrated as including multi-layer arrangement similar to that discussed above regarding FIG. 1, the multi-layer arrangement as illustrated in FIG. 2 and described above may be used in embodiments corresponding to FIG. 3.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A cover unit device for termination of an electrical cable, the device comprising:
   a unitary cold shrinkable, tubular, elastomeric cover sleeve defining a cover sleeve through passage that is configured to receive the electrical cable, the cover sleeve comprising:
   a first type of stress control element;
   a second type of stress control element that is different from the first type of stress control element and that is radially disposed around the first type of stress control element; and
   an outer insulating layer radially disposed around the second type of stress control element;
   wherein the outer insulating layer, the first type of stress control element, and the second type of stress control element are integrally formed to form a unitary structure.

2. The device according to claim 1, wherein the first type of stress control element comprises a geometrical stress relief element.

3. The device according to claim 2, wherein the geometrical stress relief element comprises a stress cone that includes an electrically conductive and/or a semiconductive portion that is configured to conductively engage a semiconductor layer of the electrical cable.

4. The device according to claim 2, wherein the second type of stress control element comprises a high dielectric constant stress relief element.

5. The device according to claim 1, wherein the outer insulating layer comprises an elastomeric material that includes at least one of ethylene propylene diene monomer (EPDM) rubber, silicone, polyurethane rubber, styrene-butadiene copolymer, polychloroprene, nitrile rubber, butyl rubber and/or polysulfide rubber.

6. The device according to claim 1, wherein the second type of stress control element is a high-K layer that comprises carbon particles embedded therein.

7. The device according to claim 1, wherein the device cover sleeve is operable to manage the electrical field and electrical stresses at operating voltages greater than 40 kVolts.

8. The device according to claim 1, further comprising a holdout that maintains the cover sleeve in an expanded state in which the cover sleeve is elastically expanded and when removed, permits the cover sleeve to radially contract to a contracted state about the electrical cable,
   wherein the holdout is a removable holdout that is mounted within the cover sleeve through passage and configured to be removed therefrom.

9. The device according to claim 1, wherein the second type of stress control element is a high-K layer that has a dielectric constant greater than 12.

10. The device according to claim 1, wherein the outer insulating layer, the first stress control element, and the second stress control element are bonded to one another to form the unitary structure.

11. The device according to claim 1, wherein:
    the first type of stress control element comprises a high K layer;
    the second type of stress control element comprises a geometrical stress relief element;
    the high K layer is disposed radially within the geometrical stress relief element; and
    the high k layer is configured to be interposed between the geometrical stress relief element and a semiconductor layer of the electrical cable and conductively engage the semiconductor layer of the electrical cable.

12. The device according to claim 11, wherein the geometrical stress relief element is a stress cone.

13. The device according to claim 12, wherein the stress cone includes an electrically conductive and/or a semiconductive portion that is configured to conductively engage the semiconductor layer of the electrical cable.

14. The device according to claim 13, wherein the stress cone includes a second electrically conductive and/or a semiconductive portion that engages an outer surface of the high K layer.

15. A method for installing a cover sleeve on an electrical cable, the method comprising the operations of:
    providing:
    a unitary cold shrinkable, tubular, elastomeric cover sleeve defining a cover sleeve through passage that is configured to receive the electrical cable, the cover comprising:
    a first type of stress control element;
    a second type of stress control element that is different from the first type of stress control element; and
    an outer insulating layer radially disposed around the second type of stress control element;
    wherein the outer insulating layer, the first type of stress control element, and the second type of stress control element are integrally formed to form a unitary structure; and
    a holdout that maintains the cover sleeve in an expanded state in which the cover sleeve is elastically expanded and when removed, permits that cover sleeve to radially contract to a contracted state about the electrical cable;
    positioning the holdout and the cover sleeve around the electrical cable; and
    removing the holdout from the cover sleeve to cause the cover sleeve to radially contract on the electrical cable.

16. The method according to claim 15, wherein the cover sleeve is operable to manage the electrical field and electrical stresses at operating voltages greater than 40 kVolts.

17. A cover system for termination of an electrical cable, the cover system comprising:
- a unitary cold shrinkable, tubular, elastomeric cover sleeve defining a cover sleeve through passage that is configured to receive the electrical cable, the cover sleeve comprising:
  - a first type of stress control element;
  - a second type of stress control element that is different from the first type of stress control element; and
  - an outer insulating layer radially disposed around the second type of stress control element;
  - wherein the outer insulating layer, the first type of stress control element, and the second type of stress control element are integrally formed to form a unitary structure;
- a holdout that maintains the cover sleeve in an expanded state in which the cover sleeve is elastically expanded and when removed, permits the cover sleeve to radially contract to a contracted state about the electrical cable;
- wherein the first type of stress control element comprises a geometric stress cone that includes an electrically conductive and/or a semiconductive portion that is configured to conductively engage a semiconductor layer of the electrical cable, and
- wherein the second type of stress control element comprises a high dielectric constant stress relief element.

18. The system according to claim 17, wherein the high dielectric constant stress relief element is a high-K layer that comprises carbon particles embedded therein.

19. The system according to claim 17, wherein an operating voltage of the electrical cable is greater than about 40 kVolts.

20. A cover unit device for termination of an electrical cable, the device comprising:
- a unitary cold shrinkable, tubular, elastomeric cover sleeve defining a cover sleeve through passage that is configured to receive the electrical cable, the cover sleeve comprising:
  - a first type of stress control element; and
  - a second type of stress control element that is different from the first type of stress control element and that is radially disposed around the first type of stress control element;
- wherein:
  - the first type of stress control element comprises a high K layer;
  - the second type of stress control element comprises a geometrical stress relief element;
  - the high K layer is disposed radially within the geometrical stress relief element between the geometric stress relief element; and
  - the high k layer is configured to be interposed between the geometrical stress relief element and a semiconductor layer of the electrical cable and conductively engage the semiconductor layer of the electrical cable.

21. The device of claim 20, wherein the geometrical stress relief element is a stress cone.

22. The device of claim 21, wherein the stress cone includes an electrically conductive and/or a semiconductive portion that is configured to conductively engage the semiconductor layer of the electrical cable.

23. The device of claim 22, wherein the stress cone includes a second electrically conductive and/or a semiconductive portion that engages an outer surface of the high K layer.

24. The device of claim 20, wherein the first type of stress control element and the second type of stress control element are integrally formed to form a unitary structure.

* * * * *

UNITED STATES PATENT AND TRADEMARK OFFICE
CERTIFICATE OF CORRECTION

PATENT NO. : 9,870,848 B2
APPLICATION NO. : 15/135781
DATED : January 16, 2018
INVENTOR(S) : Ganpathy Iyer It is certified that error appears in the above-identified patent and that said Letters Patent is hereby corrected as shown below:

In the Claims

Column 10, Claim 7, Line 1:
Please delete "device"

Signed and Sealed this
Fourteenth Day of August, 2018

Andrei Iancu
*Director of the United States Patent and Trademark Office*